(12) United States Patent
Sourani

(10) Patent No.: US 6,631,132 B1
(45) Date of Patent: Oct. 7, 2003

(54) URGENT PACKET TRANSMISSION

(75) Inventor: Sason Sourani, Hod-Hasharon (IL)

(73) Assignee: VERAZ Networks Ltd., Petach-Tikva (IL)

(*) Notice: Subject to any disclaimer, the term of this patent is extended or adjusted under 35 U.S.C. 154(b) by 0 days.

(21) Appl. No.: 09/411,287

(22) Filed: Oct. 4, 1999

(51) Int. Cl.[7] .............................................. H04L 12/56
(52) U.S. Cl. ...................... 370/389; 370/428; 370/471; 370/473; 370/474; 370/392
(58) Field of Search .................... 370/395.42, 389–392, 370/471–474, 428

(56) References Cited

U.S. PATENT DOCUMENTS

| 5,497,371 | A | | 3/1996 | Ellis et al. | |
|---|---|---|---|---|---|
| 5,689,509 | A | * | 11/1997 | Gaytan et al. | 370/396 |
| 5,768,273 | A | * | 6/1998 | Aznar et al. | 370/395.42 |
| 5,802,051 | A | * | 9/1998 | Petersen et al. | 370/395.42 |
| 5,870,394 | A | * | 2/1999 | Oprea | 370/392 |
| 5,956,341 | A | | 9/1999 | Galand et al. | 370/412 |
| 5,999,534 | A | * | 12/1999 | Kim | 370/395.42 |
| 6,154,459 | A | * | 11/2000 | Wicklund | 370/230.1 |
| 6,256,315 | B1 | * | 7/2001 | Barbas et al. | 370/412 |
| 6,272,109 | B1 | * | 8/2001 | Pei et al. | 370/230 |
| 6,411,617 | B1 | * | 6/2002 | Kilkki et al. | 370/353 |
| 6,466,578 | B1 | * | 10/2002 | Mauger et al. | 370/395.3 |
| 6,466,580 | B1 | * | 10/2002 | Leung | 370/412 |
| 6,487,171 | B1 | * | 11/2002 | Honig et al. | 370/235 |
| 2001/0015985 | A1 | * | 8/2001 | Van Grinsven et al. | 370/471 |

FOREIGN PATENT DOCUMENTS

EP  0 684 719  11/1995

* cited by examiner

*Primary Examiner*—Douglas Olms
*Assistant Examiner*—Van Nguyen
(74) *Attorney, Agent, or Firm*—Fenester & Company

(57) ABSTRACT

A method of transmitting packets from a transmitter to a receiver. The method includes providing a first packet including a header, transmitting a leading part of the first packet on a link from the transmitter to the receiver, the leading part not including a header separate from the header of the entire packet, and transmitting a second packet on the link after the leading part of the first packet was transmitted and before a remaining part of the first packet was transmitted.

25 Claims, 4 Drawing Sheets

URGENT PACKET TRANSMISSION

FIELD OF THE INVENTION

The present invention relates to communication networks and particularly to packet based networks which accommodate packets of various priorities.

BACKGROUND OF THE INVENTION

Messages transmitted from a source to a destination over a packet based network are broken up by the source into packets which are sent to the destination independently of each other. A header is annexed to each packet. The header identifies the packet providing, among other information, the source and destination of the packet, the length of the packet, and the message to which the packet belongs. The length of the packet which appears in the header is used by the destination to determine which of the bits it receives belongs to the packet. Therefore, changing the length of the packet after the header was transmitted is not considered feasible.

In many networks, especially wide area networks and networks which include low bandwidth links such as telephone lines, it is important to minimize the amount of traffic through the network. Therefore, it is desired to maximize the ratio between the amount of data of packets and the header size of the packets.

When a source transmits both time critical urgent data, such as real time packets, and non-urgent data, precedence must be given to the time critical data. The precedence is given by tagging the time critical packets as urgent and transmitting the urgent packets before other packets from a buffer of the source. However, if a source begins transmitting a long packet of about 1500 bytes and after only a few bits are sent an urgent packet is received in the buffer of the source, the urgent packet will have to wait for the entire long packet to be sent. On links with a speed of 9600 bits/second, this can require more than a second.

One method of reducing the delay incurred on urgent packets is to reduce the maximal size of all the packets transmitted along the link. Thus, the maximal amount of time that an urgent packet must wait is less than when full size packets are transmitted on the link. The size of large packets may be reduced by fragmenting the long packet into a plurality of fragment packets with separate headers. This, however, decreases the ratio between the data amount and the length of the header of the packets and/or fragments.

U.S. Pat. No. 5,956,341 to Galand et al., the disclosure of which is incorporated herein by reference, describes a method for simulating a high bandwidth link from a plurality of low bandwidth links. In this method, each packet is segmented into a plurality of segments which contain 60 bytes or less of data and a header of 4 bytes (additional to the IP packet headers of the segmented packets). Thus, segments of high priority need wait only for transmission of a single packet.

SUMMARY OF THE INVENTION

An aspect of some preferred embodiments of the invention relates to a communication system which supports interrupts during transmission of a packet. When an urgent packet is received by a transmitter while transmitting a current packet to a receiver, the transmitter sends an interrupt signal to the receiver, indicating that an urgent packet is being transmitted before the completion of the transmission of the current packet.

In a preferred embodiment of the present invention, after the urgent packet is entirely transmitted, the transmitter continues to transmit the packet which was interrupted, from the point at which it was interrupted.

In some preferred embodiments of the present invention, the interrupt signals are sent as interrupt indication bits within the interrupted packet. Preferably, the interrupt indication bits may be placed within the packets only at predetermined stop points. In a preferred embodiment of the invention, the locations of the stop points are fixed for all the transmitted packets. For example, the stop points may be located after every 64 (or any other number) of transmitted bits. Alternatively, the locations of the stop points are a function of information in a header of the current packet and/or of external information, such as data on the connectivity of a network including the transmitter and receiver and the time of day.

In a preferred embodiment of the present invention, one or more bits are inserted at each of the stop points regardless of whether an interrupt is being declared. The one or more inserted bits preferably have two possible values, either "no interrupt" or "interrupt". Normally, the one or more inserted bits have a no interrupt value. However, when an urgent packet is received at the transmitter while transmitting another non-urgent packet, at the next stop point the transmitter sets the value of the one or more inserted bits to interrupt and immediately begins transmitting the urgent packet. Alternatively, upon receiving an urgent packet, the transmitter immediately begins to transmit the urgent packet instead of the current packet, and sets the indication bits at the next stop point, accordingly.

In some preferred embodiments of the present invention, a second packet which interrupted a first packet may also be interrupted by a third packet. In a preferred embodiment, the packets are assigned levels of urgency and each packet may interrupt those packets which are less urgent than the interrupting packet.

An aspect of some preferred embodiments of the invention relates to assigning stop points and inserting bits at the stop points to indicate no interrupts, only to some of the packets transmitted by a specific transmitter. In a preferred embodiment of the invention, packets of a high urgency level are sent without inserted bits, and therefore these packets are never interrupted. Alternatively or additionally, packets shorter than a predetermined length are sent without inserted bits. In a preferred embodiment of the present invention, a short set of bits is added to each transmitted packet to indicate whether the packet includes inserted bits.

Further alternatively or additionally, interrupt indication bits are inserted only in packets sent to specific destinations, for example, destinations which comprise apparatus which supports interrupt indication bits.

There is therefore provided in accordance with a preferred embodiment of the present invention, a method of transmitting packets from a transmitter to a receiver, including providing a first packet including a header, transmitting a leading part of the first packet on a link from the transmitter to the receiver, the leading part not including a header separate from the header of the entire packet, and transmitting a second packet on the link after the leading part of the first packet was transmitted and before a remaining part of the first packet was transmitted.

Preferably, transmitting the second packet includes transmitting a packet which is more urgent than the first packet.

In a preferred embodiment, the second packet includes a real time audio packet.

Preferably, the method includes notifying the receiver, after transmitting the leading part of the first packet, that data transmitted on the channel from a specific point on belongs to the second packet. Preferably, notifying the receiver includes transmitting a predetermined sequence of bits on the channel after the leading part of the first packet. Preferably, transmitting a predetermined sequence of bits includes transmitting the sequence at one or more predetermined stop points along the first packet.

Preferably, the method includes transmitting a predetermined sequence of bits, different from the sequence used to notify that the data from a specific point on belongs to the second packet, at those predetermined stop points not used for the notifying.

In a preferred embodiment, notifying the receiver that the bits transmitted from a specific point on belong to the second packet includes notifying the receiver before transmitting any part of the second packet. Preferably, notifying the receiver that the bits transmitted from a specific point on belong to the second packet includes notifying the receiver that the bits transmitted immediately after the notification belong to the second packet.

Alternatively or additionally, notifying the receiver that the bits transmitted from a specific point on belong to the second packet includes notifying the receiver after transmitting at least part of the second packet.

Preferably, the method includes transmitting a remaining part of the first packet, not previously transmitted, after transmitting the second packet. Preferably, the leading part of the first packet is not retransmitted after transmitting the second packet.

Preferably, the second packet is ready for transmission only after the transmitting of the leading part of the first packet. Preferably, transmitting the leading part of the first packet includes transmitting a field which indicates the length of the entire first packet.

Preferably, transmitting the second packet includes receiving the second packet after the transmitting of the leading part of the first packet, determining whether the second packet should be transmitted prior to the transmission of a remainder of the first packet, and transmitting the second packet responsive to the determination.

Preferably, a plurality of first packets are transmitted on the link and transmitting the second packet before a remaining part of the first packet was transmitted is performed for less than all of the first packets.

There is further provided in accordance with a preferred embodiment of the present invention, a method of transmitting packets from a transmitter to a receiver, including beginning to transmit a first packet, receiving a second packet after transmitting one or more bits of the first packet, determining whether the second packet should be transmitted prior to the transmission of a remainder of the first packet, and transmitting the second packet responsive to the determination before transmitting a remaining part of the first packet.

There is further provided in accordance with a preferred embodiment of the present invention, a method of transmitting packets from a transmitter to a receiver, including transmitting a first packet from the transmitter to the receiver, and transmitting at predetermined stop points within the first packet a set of bits which indicate that no interruption is being declared in the transmission of the first packet.

Preferably, the set of indicating bits indicates that the following bits until a next stop point belong to the first packet. Alternatively, the set of indicating bits indicates that the previous bits from a previous stop point belong to the first packet. Preferably, the predetermined stop points are located at predetermined fixed intervals of bits within the first packet. Preferably, the predetermined stop points are located at adjustable locations within the first packet. Alternatively or additionally, indication of the locations of the predetermined stop points is contained in at least one field of a header of the first packet.

There is further provided in accordance with a preferred embodiment of the present invention, a transmitter, including a buffer operative to receive regular packets and urgent packets, a physical layer unit which transmits packets from the buffer, and a controller adapted to interrupt the transmission of a packet of which at least one bit was already transmitted and to initiate the transmission of an urgent packet before a remaining part of the interrupted packet was transmitted responsive to reception of the urgent packet in the buffer.

Preferably, the buffer includes a regular buffer for regular packets and an urgent buffer for urgent packets.

There is further provided in accordance with a preferred embodiment of the present invention, a transmitter, including a buffer which receives packets which include respective headers, and a physical layer unit which transmits packets from the buffer, at least one first packet is transmitted after transmitting a leading part of a second packet and before transmitting a remaining part of the second packet, the leading part of the second packet not including a header separate from the header of the entire second packet.

There is further provided in accordance with a preferred embodiment of the present invention, a transmitter, including a buffer which receives packets for transmission, a physical layer unit which transmits packets from the buffer, and a processor which inserts at predetermined stop points within the transmitted packets a set of bits which indicates whether an interruption is being declared in the transmission of the packet.

There is further provided in accordance with a preferred embodiment of the present invention, a receiver, including a physical layer unit which receives bits over a link, and a processor which groups the bits into packets, at least one first packet is grouped from bits received after receiving a leading part of a second packet and before receiving a remaining part of the second packet, the leading part of the second packet not including a header separate from the header of the entire second packet.

There is further provided in accordance with a preferred embodiment of the present invention, a receiver, including a physical layer unit which receives a stream of bits, and a processor which examines at predetermined stop points within the stream a set of bits which indicates whether the stream includes bits from a second packet before all the bits from a first packet were included in the stream.

Preferably, the processor removes the set of bits from the stream. Preferably, the processor is adapted to divide the stream into packets responsive to the examination.

There is further provided in accordance with a preferred embodiment of the present invention, a communication system, including a communication link, a transmitter operative to transmit a stream of bits on the communication link, which stream includes one or more sets of indication bits which indicate whether bits from a first packet have been included in the stream between bits from a second packet, and a receiver operative to identify the indication bits and parse the stream into packets responsive to the indication bits.

There is further provided in accordance with a preferred embodiment of the present invention, a communication system, including a communication link, a receiver which receives packets over the communication link, and a transmitter which transmits packets over the communication link and is operative, upon receiving an urgent packet, to defer transmission of a packet of which at least one bit was already transmitted in order to transmit an urgent packet before a remaining part of the interrupted packet was transmitted, and to notify the receiver of the transmitted urgent packet.

BRIEF DESCRIPTION OF THE DRAWINGS

The invention will be more clearly understood by reference to the following description of preferred embodiments thereof in conjunction with the figures, in which.

DETAILED DESCRIPTION OF PREFERRED EMBODIMENTS

Figure 1:
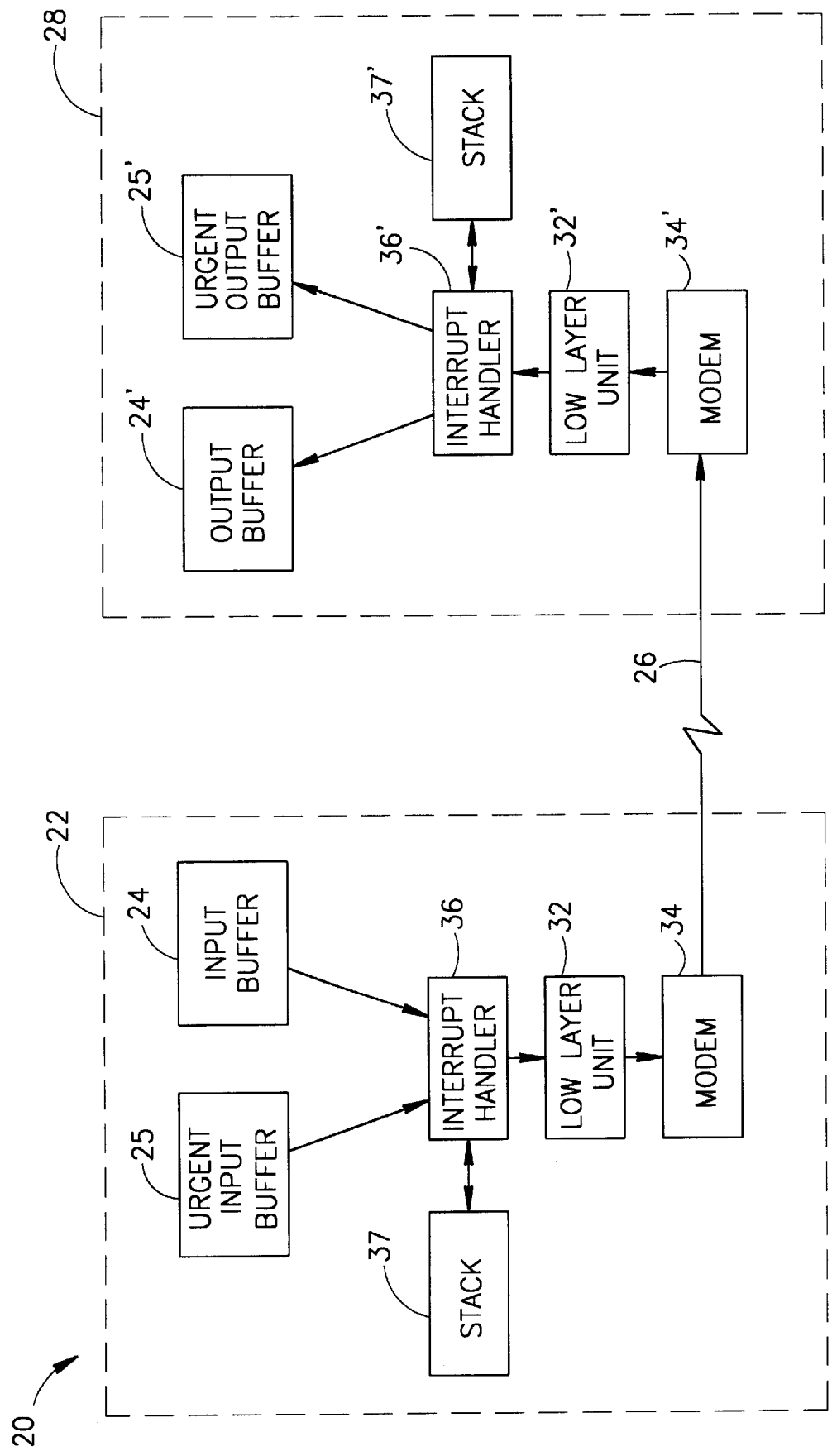
FIG. 1 is a schematic illustration of a system for transmitting packets, in accordance with a preferred embodiment of the invention.

FIG. 1 is a schematic illustration of a system 20 for transmitting packets, in accordance with a preferred embodiment of the invention. System 20 is preferably part of a packet based communication network. FIG. 1 shows a transmitter 22, a receiver 28 and a link 26 connecting the transmitter and receiver. The distinction between the transmitter and receiver is for clarity of the following explanation. Preferably, both transmitter 22 and receiver 28 may receive and transmit packets. In a preferred embodiment of the invention, transmitter 22 and receiver 28 are of a substantially identical structure.

Link 26 preferably comprises a single channel which allows transmission of only a single data bit at any specific time.

Transmitter 22 preferably comprises an input buffer 24 for regular packets and an urgent buffer 25 for urgent packets, such as real time audio packets, control messages and echo packets of keyboard strokes. Transmitter 22 further comprises an interrupt handler 36 which receives packets from buffers 24 and 25 and prepares them for transmission, the operation of the interrupt handler is described below. Interrupt handler 36 is preferably associated with at least one stack 37 for storing control data relating to interrupted packets. From the interrupt handler the packets are passed to a low layer unit 32, for example an HDLC handler, which prepares the packets for transmission on link 26 according to the specific type of the link. Preferably, low layer unit 32 passes the packets to a modem 34, or to another physical layer unit, which transmits the bits of the packet to receiver 28. In a similar manner, receiver 28 preferably comprises a modem 34', a low layer unit 32', an interrupt handler 36' and output buffers 24' and 25'. Alternatively, receiver 28 comprises only a single output buffer.

Figure 2:
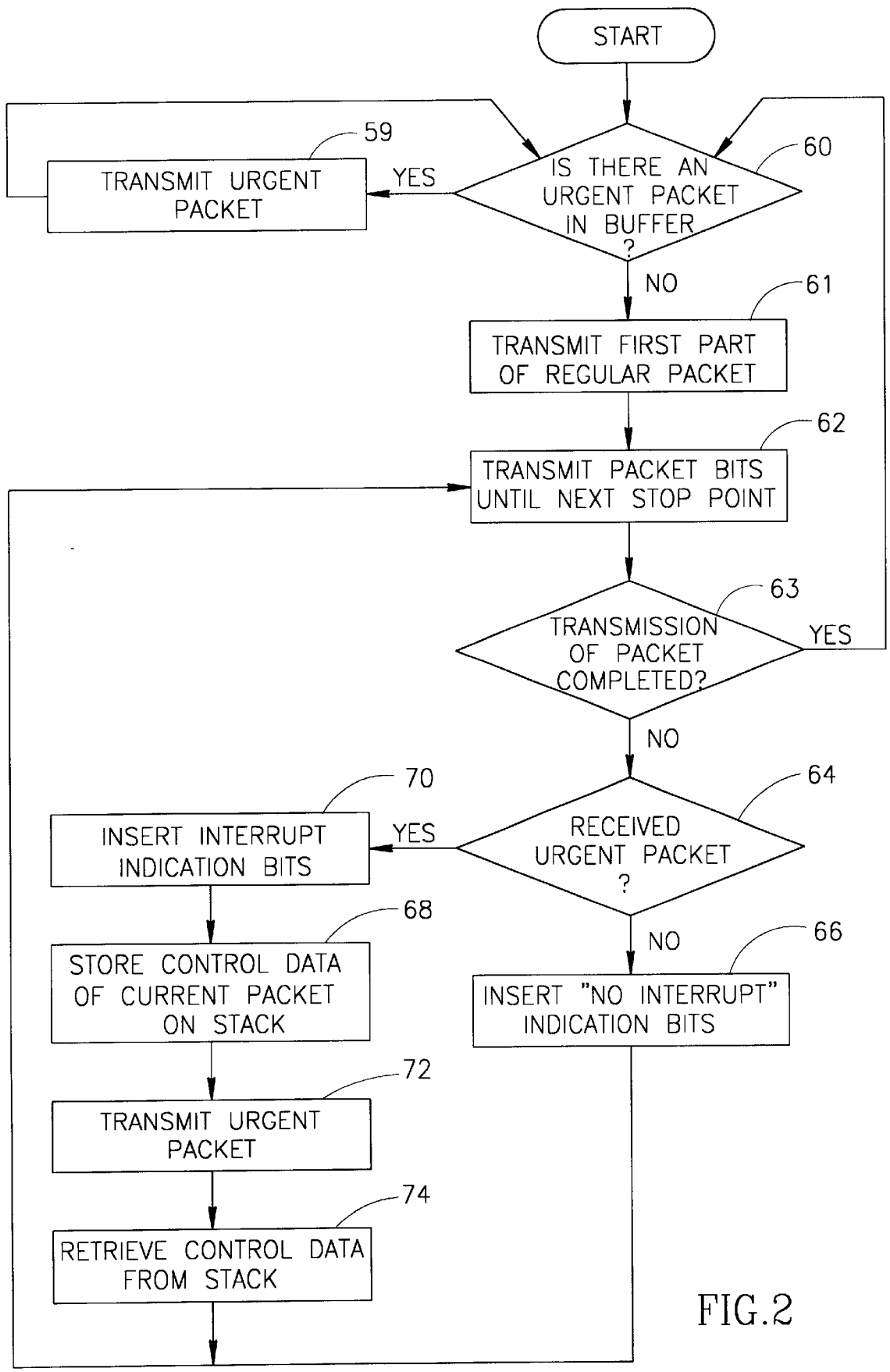
FIG. 2 is a schematic flowchart of the actions performed by a transmitter, in accordance with a preferred embodiment of the present invention.
Figure 3:
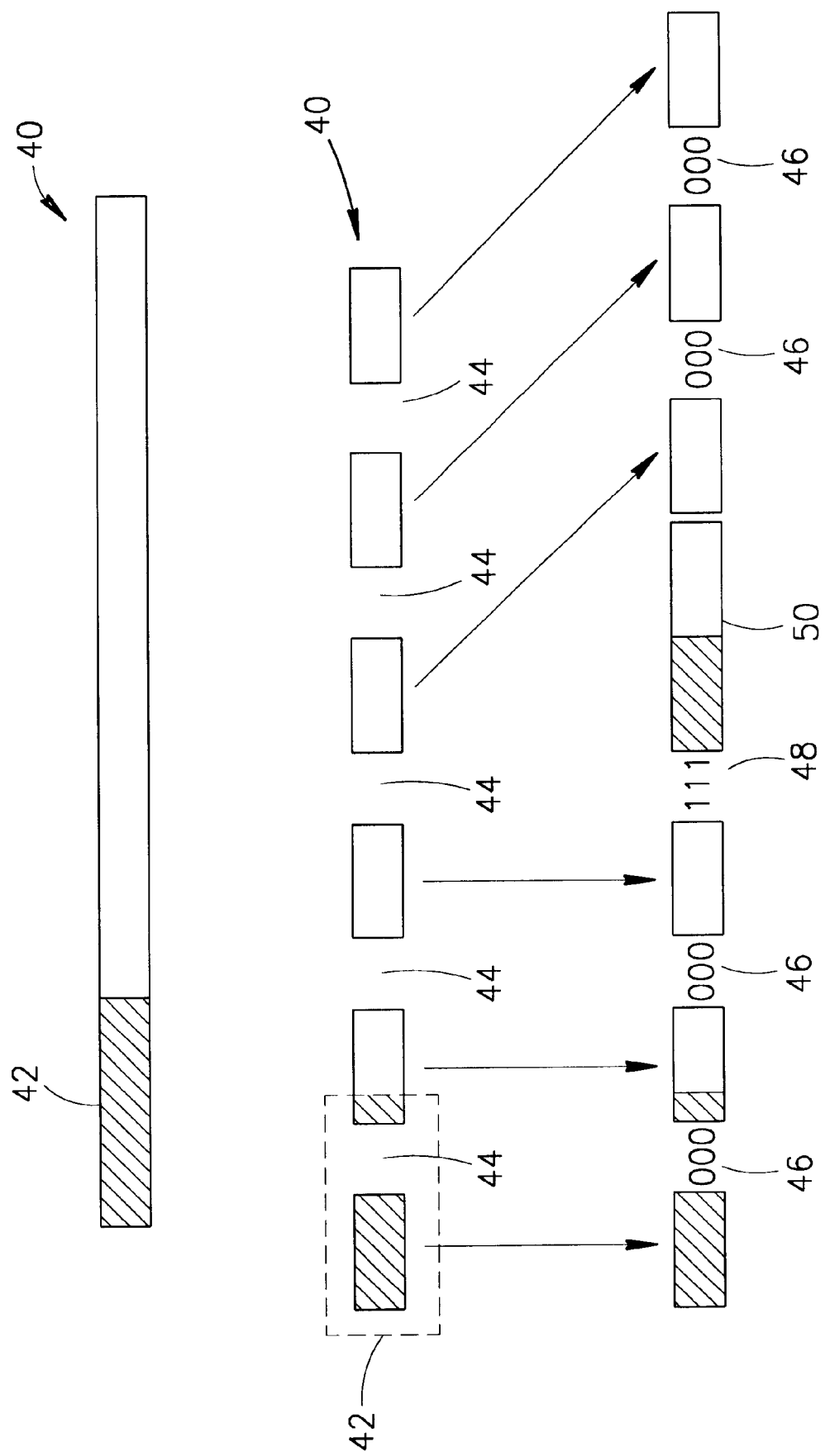
FIG. 3 is a schematic illustration of a packet transmitted with interrupt indication bits, in accordance with a preferred embodiment of the invention.

FIG. 2 is a flowchart of the actions performed by interrupt handler 36 of transmitter 22, in accordance with a preferred embodiment of the present invention. Reference is also made to FIG. 3 which is a schematic illustration of a packet transmitted by transmitter 22 in various stages, in accordance with a preferred embodiment of the present invention.

When link 26 is idle, interrupt handler 36 checks (60) whether there are any urgent packets to be transmitted. If there are urgent packets they are transmitted (59) before any of the regular packets in buffer 24. If there are no urgent packets to be transmitted, interrupt handler 36 receives a regular packet 40 (if one exists), including a header 42, from buffer 24 and passes (61, 62 and 63) the bits of the packet serially to low layer unit 32. At predefined stop points 44 throughout packet 40, interrupt handler 36 preferably checks (64) whether an urgent packet has been received. If no urgent packet was received, interrupt handler 36 passes (66) for transmission a set of bits 46 (for example "000" as in FIG. 3) which indicate that an interrupt is not declared. If, however, an urgent packet 50 was received, interrupt handler 36 stores (68) control data related to the packet on stack 37, while the rest of packet 40 is preferably withheld in input buffer 24. In addition, interrupt handler 36 preferably passes (70) for transmission a set of one or more interrupt indication bits 48 ("111" in FIG. 3) which indicate that an interrupt is declared. Preferably, interrupt handler 36 immediately begins to pass (72) for transmission the bits of the urgent packet.

When the transmission of urgent packet 50 is completed, interrupt handler 36 retrieves (74) the control data of the interrupted packet 40 from stack 37 and continues streaming the bits of packet 40 from input buffer 24 to low layer unit 32, preferably, together with periodically added sets of bits 46. Alternatively, packet 40 is retransmitted in its entirety.

Figure 4:
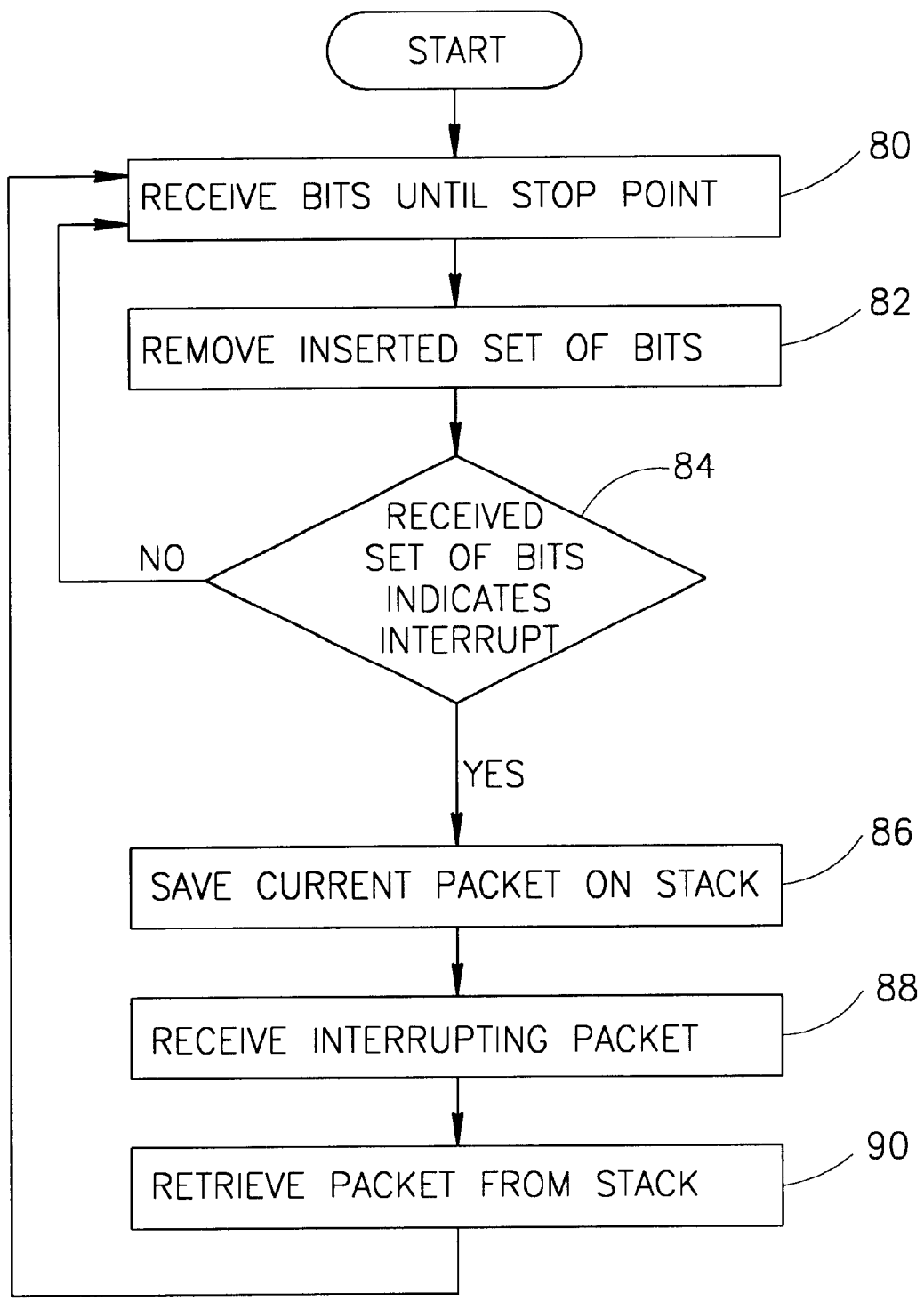
FIG. 4 is a schematic flowchart of the actions performed by a receiver, in accordance with a preferred embodiment of the present invention.

FIG. 4 is a flowchart of the actions performed by receiver 28, in accordance with a preferred embodiment of the present invention. Bits transmitted over link 26 are received (80) by modem 34' and low layer unit 32' and are passed to interrupt handler 36'. At the predefined stop points 44 interrupt handler 36' examines (84) the received set of bits which indicates whether an interrupt is declared. The set of bits (46 or 48) is preferably removed (82) from the stream of bits. If the set of bits indicates that no interrupt is declared (set 46), interrupt handler 36' continues receiving the bits as usual. If, however, the bits indicate that an interrupt is declared (set 48), interrupt handler 36' saves (86) the packet being received on stack 37', preferably together with related control data, and begins receiving (88) the interrupting packet. Preferably, interrupt handler 36' checks the header of the interrupting packet for the length of the packet in order to know when the interrupting packet is finished. When the interrupting packet has been entirely received, interrupt handler 36' retrieves (90) the interrupted packet from stack 37' and adds the subsequently received bits to the interrupted packet.

Referring in more depth to the issue of the locations of stop points 44, in a preferred embodiment of the invention, stop points 44 are located at fixed intervals of a predetermined number of bits. Minimizing the maximal delay incurred on an urgent packet requires making stop points 44 as frequent as possible. On the other hand frequently transmitting bit sets 46 incurs additional traffic on link 26. Therefore, the length of the fixed intervals is determined as a compromise between minimizing the maximal delay on urgent packets and minimizing the overhead traffic.

Preferably, the fixed intervals of stop points 44 begin at the beginning of each packet 40. Alternatively, the fixed intervals begin after headers 42 of the packets, such that interrupts cannot be declared within the header of a packet. Further alternatively, the fixed intervals are continuously counted over packets, preferably, until an urgent packet is encountered. In a preferred embodiment of the invention, stop points 44 are not defined within a predetermined interval from the end of the transmitted packets.

Alternatively, to placing stop points 44 at fixed intervals along packet 40, the stop points are placed in accordance with a predetermined series of intervals. In a preferred embodiment, the intervals between stop points 44 increase with the progression of the packet, such that the stop points are more frequent at the beginning of the packet than at the end of the packet.

In a preferred embodiment of the present invention, the system manager of system 20 sets the locations of stop points 44 based on parameters of the system, such as the urgency level of the urgent packets, the occurrence rate of urgent packets, and the traffic load on link 26. Alternatively or additionally, a managing processor of system 20 sets the locations of stop points 44 automatically based on measurements of the above parameters and/or other parameters of system 20. Preferably, the managing processor sets the rules of determining the locations of stop points 44 each time link 26 is brought up. Alternatively, the managing processor sets the rules determining the locations of stop points 44 periodically, for example, every 15–30 minutes. The managing processor sends the determined rules to both transmitter 22 and receiver 28, and preferably allows the new rules to come into effect only after confirmation has been received from both the transmitter and the receiver.

In some preferred embodiments of the present invention, the rules for determining the locations of stop points 44 vary with parameters of system 20, such as the connectivity of system 20, e.g., failure of links within the system. Alternatively or additionally, the rules depend on parameters external to system 20, such as the time of day, which in some systems is indicative of the urgency level and/or the occurrence rate of urgent packets.

Further alternatively or additionally, the locations of stop points 44 are indicated by information in the header of the transmitted packet. Preferably, the header of the packet does not include stop points or includes stop points at fixed points which do not change responsive to the contents of the header. When receiver 28 receives a new packet it immediately reads the header to determine the locations of the stop points in receiving the rest of the packet.

In a preferred embodiment, the locations of stop points 44 depend on the source and/or destination of the packet. In some systems, the source and/or destination are indicative of the urgency level and/or occurrence rate of urgent packets and/or of other parameters of the system. Alternatively or additionally, the locations of stop points 44 depend on the length of packet 40. In a preferred embodiment, short packets do not include stop points 44 while long packets include frequent stop points. Further alternatively or additionally, header 42 includes explicit indication of the locations of stop points 44.

In a preferred embodiment of the present invention, the locations of stop points 44 are set according to knowledge on when urgent packets are expected. For example, if the urgent packets comprise real time audio data, the packets are usually generated at fixed intervals. Therefore, stop points 44 are preferably set such that an interrupt may be declared immediately after receiving an urgent packet.

In some preferred embodiments of the present invention, in some packets no stop points 44 are defined and no interrupts are allowed. For example, packets transmitted to receivers which do not recognize interrupts preferably do not include stop points. When link 26 is brought up, transmitter 22 preferably checks with receiver 28 whether it recognizes interrupts. If it does not recognize interrupts all the packets sent to receiver 28 are sent without adding indication bits.

It is noted that unlike fragmentation, the inserted indication bits are transparent to external units. That is, once the indication bits are removed by receiver 28, there is no way for a third unit receiving a packet from the receiver to know whether the received packet was interrupted or whether interrupt indication bits were inserted to the packet.

Referring now in more detail to the sets of bits used to indicate whether an interrupt is declared, in a preferred embodiment of the present invention, the same number of bits is used to declare an interrupt and to indicate that an interrupt is not declared. In a preferred embodiment, a fixed number of bits, preferably between three to five bits, are inserted in each stop point. Preferably, the distance between the "interrupt" and "no interrupt" bit sets is as large as possible in order to allow for determining which of sets 46 and 48 was received even when errors have occurred during the transmission of the indication bits. Immunity to transmission errors is more important in the indication bits than in regular bits since the implications of a mistake in determining what is indicated by the indication bits goes beyond the boundaries of a single packet. Alternatively, a single bit is used in each stop point 44 to notify whether an interrupt is declared.

In some preferred embodiments of the present invention, when receiver 28 determines from the inserted set of bits (46 or 48) that an interrupt was declared, it checks the interrupting packet for a standard packet structure to make sure that there was no mistake in receiving the inserted set of bits (46 or 48). For example, receiver 28 preferably checks that the interrupting packet has a header in accordance with a standard header form.

Alternatively to using the same number of bits for the "interrupt" and "no interrupt" bit sets (46 and 48 respectively), the "no interrupt" bit set is shorter than the "interrupt" bit set since the interrupt bit set generally appears more often. In a preferred embodiment of the present invention, a single '0' bit is used to indicate that no interrupt is declared, while a long set of bits, e.g., 16 bits, beginning with a '1', is used to declare an interrupt.

Further alternatively or additionally, bits are added at a stop point 44 only if an interrupt is declared. Preferably, the number of added bits is large enough to make marginally small the possibility that the specific sequence used to declare an interrupt appears in the stop point by chance.

Further alternatively or additionally, bits are added to indicate an interrupt at any point along packet 40 and no stop points 44 are defined, preferably using a code which does not appear in normal packets.

Referring back to inserting the urgent packet 50, in some preferred embodiments of the present invention, the urgent packet is not inserted immediately after the interrupt indication bits. Instead, the urgent packet is inserted a fixed number of bits after the interrupt indication bits. Preferably, urgent buffer 25 notifies interrupt handler 36 that an urgent packet has been received before a header is prepared for the urgent packet. If a stop point is encountered between receiving notification of a received urgent packet and actually receiving the packet, interrupt handler 36 may insert indication bits to the stop point under the knowledge that the urgent packet will be available for transmission by the time it is to be transmitted.

Alternatively or additionally, when transmitter 22 receives an urgent packet before the next stop point (especially when the next stop point is still far away), the transmitter begins transmitting the urgent packet before the stop point is reached. At the stop point, transmitter 22 indicates where the transmission of the urgent packet began. Preferably, transmitter 22 interrupts the current packet only if there is a substantial part of the packet which was not transmitted yet. In a preferred embodiment, transmitter 22 interrupts the current packet only if the current packet includes non-transmitted bits at least up to the next stop point. Thus, receiver 28 does not examine the contents of the transmitted bits, under the wrong assumption that the bits belong to the interrupted packet, before the stop point with the notification of the interrupt is reached.

In some preferred embodiments of the present invention, when an interrupt is indicated by the set of bits inserted at the stop point, an additional set of bits indicates the exact location where the transmission of the urgent packet began. In an exemplary embodiment, the stop points are located at intervals of 256 bits and the additional set of bits comprises a set of eight bits which indicates the displacement from the stop point to the location where the transmission of the urgent packet began. In another example, the additional set of bits comprises four bits which are multiplied by a factor of sixteen to receive the displacement. In this example, the beginning of transmitting the urgent packet is allowed only every sixteen bits. The displacement may be stated as a positive number which states the displacement in one direction, or as a signed number which may indicate the displacement both in forward and backward directions.

Alternatively or additionally, the bits inserted at stop points 44 may have more than two predetermined codes. Preferably, in addition to a code which indicates that no interrupt is declared, the inserted bits may have a few different codes for indicating that an interrupt is declared. These codes preferably differ in the placement for inserting the urgent packet. For example, a first code may indicate that the urgent packet follows immediately, a second code indicates that the urgent packet follows after 20 more bits of original packet 40 and a third code indicates that the urgent packet follows after 40 more bits of original packet 40. Thus, the intervals between stop points 44 may be made larger without increasing the delay of urgent packets.

In some preferred embodiments of the present invention, the maximal number of interrupts allowed within a single packet is limited to a predetermined number, so that normal packets do not suffer too much delay due to the interrupts. Preferably, once the number of interrupts declared within a packet 40 reaches the maximal number no more stop points 44 are defined in the packet. In a preferred embodiment of the present invention, the maximal number of allowed interrupts varies. In a preferred embodiment, header 42 indicates, implicitly or explicitly, the maximal number of allowed interrupts in the packet 40. Alternatively or additionally, the number of allowed interrupts in a packet vary according to the time of day and/or according to information related to system 20.

Referring back to determining when the urgent packet terminates, in some preferred embodiments of the present invention, termination bits having a specific code are added after the urgent packet. Preferably, these termination bits are used in addition to, or instead of, the length field in the header of the urgent packet. Alternatively or additionally, an interrupt header is inserted before the urgent packet identifying the transmission as an interrupt, and giving its length.

In some preferred embodiments of the present invention, a stop point is defined immediately after the end of urgent packet 50. Thus, if an urgent packet is received by interrupt handler 36 while a previous urgent packet is being transmitted, the newly received urgent packet is transmitted immediately after the transmission of the previous urgent packet is completed.

Although the above description relates to a two level hierarchy of urgency levels, i.e., urgent and regular packets, preferred embodiments of the present invention may also be implemented in a system with many urgency levels. In these preferred embodiments, packets with an urgency level higher than the currently transmitted packet interrupt the currently transmitted packet. Preferably, stop points are defined also in the interrupting packets (if they are long) such that interrupts may be declared also in interrupting packets. Preferably, stack 37 is capable of storing a plurality of nested packets. In addition, transmitter 22 preferably comprises a plurality of buffers for the different urgency levels. Alternatively, transmitter 22 comprises a single addressable buffer which receives all the packets together with indication of their priority.

It is noted that transmitter 22 and/or receiver 28 may include higher layer units which are located above buffers 24, 25, 24' and 25'. Such higher layer units preferably operate exactly as if interrupt handler 36 was not located within the transmitter. Alternatively, the higher layer units are located between interrupt handler 36 and buffers 24 and 25 or between interrupt handler 36 and low layer unit 32. In these alternatives the higher layer units are preferably altered to accommodate the existence of interrupt handler 36.

Alternatively to having interrupt handler 36 located between buffers 24 and 25 and low layer unit 32, interrupt handler 36 is formed as an integral part of low layer unit 32. Further alternatively, interrupt handler 36 is located between low layer unit 32 and modem 34. In such a case, the signals transmitted on link 26 violate the standards of the low layer, because of the inserted sets of indication bits. However, since the transmitter and receiver have compatible interrupt handlers 36 no problems are caused due to such violation.

Interrupt handler 36 and low layer 32 are preferably implemented in software on a single processor. Alternatively, one or both of interrupt handler 36 and low layer 32 are implemented on separate processors or in dedicated hardware.

It is noted that the principles of the present invention are not limited to the transmitter illustrated in FIG. 1. Rather, the principles of the present invention may be implemented in substantially any packet based transmission system. For example, in some preferred embodiments of the present invention, transmitter 22 also includes a MAC unit or other layer 2 unit of the TCP/IP protocol suite.

Although in the above description interrupts are declared by inserting bits into the stream of data bits, in other preferred embodiments interrupts are declared using other methods, for example using a dedicated transmission path parallel to link 26. In a preferred embodiment, the dedicated transmission path carries a binary signal which indicates whether an interrupt is being declared. Preferably, when the dedicated transmission path indicates that an interrupt has been declared, the urgent packet begins at a next stop point within the stream of data. Alternatively, the urgent packet begins immediately and no stop points are predefined.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of preferred embodiments thereof that are provided by way of example and are not intended to limit the scope of the invention. It should be understood that features described with respect to one embodiment may be used with other embodiments and that not all embodiments of the invention have all of the features shown in a particular figure. Variations of embodiments described will occur to persons of the art. Furthermore, the terms "comprise," "include," "have" and their conjugates, shall mean, when used in the claims, "including but not necessarily limited to." The scope of the invention is limited only by the following claims:

What is claimed is:

1. A method of transmitting packets from a transmitter to a receiver, comprising:

providing a first packet including a header;

transmitting a leading part of the first packet on a link from the transmitter to the receiver, the leading part not including a header separate from the header of the entire packet;

transmitting a second packet on the link after the leading part of the first packet was transmitted and before a remaining part of the first packet was transmitted; and notifying the receiver, after transmitting the leading part of the first packet, that data transmitted on the channel from a specific point on belongs to the second packet.

2. A method according to claim 1, wherein transmitting the second packet comprises transmitting a packet which is more urgent than the first packet.

3. A method according to claim 2, wherein the second packet comprises a real time audio packet.

4. A method according to claim 1, wherein notifying the receiver comprises transmitting a predetermined sequence of bits on the channel after the leading part of the first packet.

5. A method according to claim 4, wherein transmitting a predetermined sequence of bits comprises transmitting the sequence at one or more predetermined stop points along the first packet.

6. A method according to claim 5, comprising transmitting a predetermined sequence of bits, different from the sequence used to notify that the data from a specific point on belongs to the second packet, at those predetermined stop points not used for the notifying.

7. A method according to claim 1, wherein notifying the receiver that the bits transmitted from a specific point on belong to the second packet comprises notifying the receiver before transmitting part of the second packet.

8. A method according to claim 7, wherein notifying the receiver that the bits transmitted from a specific point on belong to the second packet comprises notifying the receiver that the bits transmitted immediately after the notification belong to the second packet.

9. A method according to claim 1, wherein notifying the receiver that the bits transmitted from a specific point on belong to the second packet comprises notifying the receiver after transmitting at least part of the second packet.

10. A method according to claim 1, comprising transmitting a remaining part of the first packet, not previously transmitted, after transmitting the second packet.

11. A method according to claim 10, wherein the leading part of the first packet is not retransmitted after transmitting the second packet.

12. A method according to claim 1, wherein the second packet is ready for transmission only after the transmitting of the leading part of the first packet.

13. A method according to claim 1, wherein transmitting the leading part of the first packet comprises transmitting a field which indicates the length of the entire first packet.

14. A method according to claim 1, wherein transmitting the second packet comprises:

receiving the second packet after the transmitting of the leading part of the first packet;

determining whether the second packet should be transmitted prior to the transmission of a remainder of the first packet; and transmitting the second packet responsive to the determination.

15. A method according to claim 1, wherein a plurality of first packets are transmitted on the link and wherein transmitting the second packet before a remaining part of the first packet was transmitted is performed for less than all of the first packets.

16. A method of transmitting packets from a transmitter to a receiver, comprising:

transmitting a first packet from the transmitter to the receiver; and transmitting at predetermined stop points within the first packet a set of bits which indicate that no interruption is being declared in the transmission of the first packet.

17. A method according to claim 16, wherein the set of indicating bits indicates that the following bits until a next stop point belong to the first packet.

18. A method according to claim 16, wherein the set of indicating bits indicates that the previous bits from a previous stop point belong to the first packet.

19. A method according to claim 16, wherein the predetermined stop points are located at predetermined fixed intervals of bits within the first packet.

20. A method according to claim 16, wherein the predetermined stop points are located at adjustable locations within the first packet.

21. A method according to claim 20, wherein indication of the locations of the predetermined stop points is contained in at least one field of a header of the first packet.

22. A transmitter, comprising:

a buffer operative to receive packets for transmission;

a physical layer unit which transmits packets from the buffer; and a processor adapted to insert at predetermined stop points within the transmitted packets a set of bits which indicates whether an interruption is being declared in the transmission of the packet.

23. A receiver, comprising:

a physical layer unit which receives a stream of bits; and a processor adapted to examine at predetermined stop points within the stream a set of bits which indicates whether the stream includes bits from a second packet before all the bits from a first packet were included in the stream.

24. A receiver according to claim 23, wherein the processor is adapted to remove the set of bits from the stream.

25. A receiver according to claim 23, wherein the processor is adapted to divide the stream into packets responsive to the examination.

* * * * *